US012634075B2

(12) United States Patent
Wei et al.

(10) Patent No.: US 12,634,075 B2
(45) Date of Patent: May 19, 2026

(54) INTERFERENCE MEASUREMENT REFERENCE SIGNAL

(71) Applicant: ZTE Corporation, Shenzhen (CN)

(72) Inventors: Xingguang Wei, Shenzhen (CN); Xing Liu, Shenzhen (CN); Xianghui Han, Shenzhen (CN); Junfeng Zhang, Shenzhen (CN); Shuaihua Kou, Shenzhen (CN); Jian Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 370 days.

(21) Appl. No.: 18/489,680

(22) Filed: Oct. 18, 2023

(65) Prior Publication Data

US 2024/0048316 A1 Feb. 8, 2024

Related U.S. Application Data

(63) Continuation of application No. PCT/CN2022/088865, filed on Apr. 24, 2022.

(51) Int. Cl.
| | |
|---|---|
| *H04L 5/00* | (2006.01) |
| *H04W 24/10* | (2009.01) |
| *H04W 52/32* | (2009.01) |

(52) U.S. Cl.
CPC ........... *H04L 5/0048* (2013.01); *H04W 24/10* (2013.01); *H04W 52/325* (2013.01)

(58) Field of Classification Search
CPC .... H04L 5/0048; H04W 24/10; H04W 52/325
See application file for complete search history.

(56) References Cited

U.S. PATENT DOCUMENTS

| | | | |
|---|---|---|---|
| 9,231,968 B2 | 1/2016 | Fang et al. | |
| 2011/0182202 A1 | 7/2011 | Olofsson et al. | |
| (Continued) | | | |

FOREIGN PATENT DOCUMENTS

| | | |
|---|---|---|
| CN | 110050493 | 7/2019 |
| WO | 2012/167431 A1 | 12/2012 |
| (Continued) | | |

OTHER PUBLICATIONS

Office Action for co-pending Vietnamese Appl. No. 1-2024-05524, Office Action dated Mar. 28, 2025, 3 pages with unofficial English translation.

(Continued)

*Primary Examiner* — Deepa Belur
(74) *Attorney, Agent, or Firm* — Perkins Coie LLP

(57) ABSTRACT

Techniques are described for configuration and/or transmission of reference signals. An example wireless communication method includes transmitting, by a first network device, a first reference signal to a second network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1; and receiving, by the first network device from the second network device, a measurement report in response to the transmitting the first reference signal.

20 Claims, 9 Drawing Sheets

(56) References Cited

U.S. PATENT DOCUMENTS

| | | | |
|---|---|---|---|
| 2013/0194982 A1 | 8/2013 | Fwu et al. | |
| 2017/0290023 A1* | 10/2017 | Zhu | H04L 5/0032 |
| 2017/0339660 A1* | 11/2017 | Kazmi | H04W 64/003 |
| 2019/0098615 A1 | 3/2019 | Wang et al. | |
| 2020/0328861 A1 | 10/2020 | Malladi et al. | |
| 2021/0185726 A1 | 6/2021 | Xu et al. | |
| 2022/0046453 A1 | 2/2022 | Lee et al. | |
| 2022/0150012 A1 | 5/2022 | Su et al. | |
| 2022/0174517 A1 | 6/2022 | Jiao et al. | |
| 2023/0137450 A1* | 5/2023 | Liu | H04L 1/1854 |
| | | | 370/329 |
| 2023/0180081 A1 | 6/2023 | Yang et al. | |
| 2023/0362763 A1 | 11/2023 | Hu et al. | |
| 2025/0175295 A1* | 5/2025 | Hao | H04L 5/0048 |
| 2025/0184970 A1* | 6/2025 | Li | H04B 17/328 |
| 2025/0233650 A1 | 7/2025 | Watts et al. | |

FOREIGN PATENT DOCUMENTS

| | | | |
|---|---|---|---|
| WO | 2018/028619 | 2/2018 | |
| WO | 2020/020376 | 1/2020 | |
| WO | 2020/029896 | 2/2020 | |
| WO | 2020/144624 A1 | 7/2020 | |
| WO | 2020/166946 | 8/2020 | |
| WO | 2020/170218 A1 | 8/2020 | |
| WO | WO-2023209617 A1 * | 11/2023 | ......... H04W 72/044 |

OTHER PUBLICATIONS

International Search Report and Written Opinion for PCT/CN2022/088865, filed Apr. 24, 2022, Report dated Dec. 21, 2022, 9 pages.

Extended European Search Report for EP Appl. No. 22 938 840.0, Report dated Mar. 20, 2025, 11 pages.

CMCC, "Status Report for SI on remote interference management for Nr" 3GPP TSG RAN meeting #82 Sorrento, Italy, Dec. 10-13, 2018, RP-182510, 15 pages.

CMCC "Updated summary for NR-RIM" 3GPP TSG RAN WG 1 Meeting, #94bis, Chengdu, China, Oct. 8-12, 2018, R1-1811981, 35 pages.

Partial Supplementary European Search Report for EP Patent Application 22 938 841.8, dated Jan. 7, 2025, 16 pages.

Extended European Search Report for EP Patent Application 22 938 841.8, dated Mar. 28, 2025, 14 pages.

USPTO, Non-Final Office Action for U.S. Appl. No. 18/529,252, mailed on Dec. 17, 2025, 20 pages.

* cited by examiner

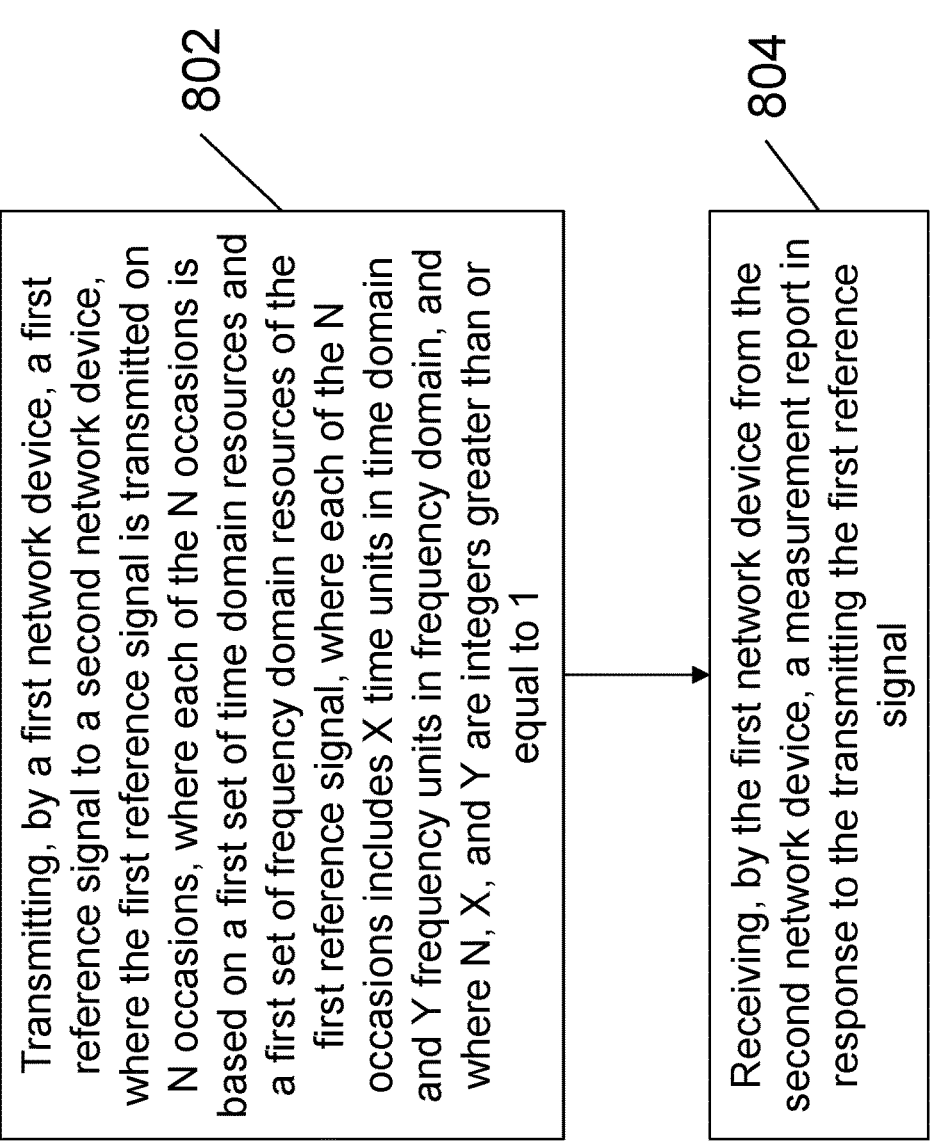

802

Transmitting, by a first network device, a first reference signal to a second network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1

804

Receiving, by the first network device from the second network device, a measurement report in response to the transmitting the first reference signal

FIG. 8

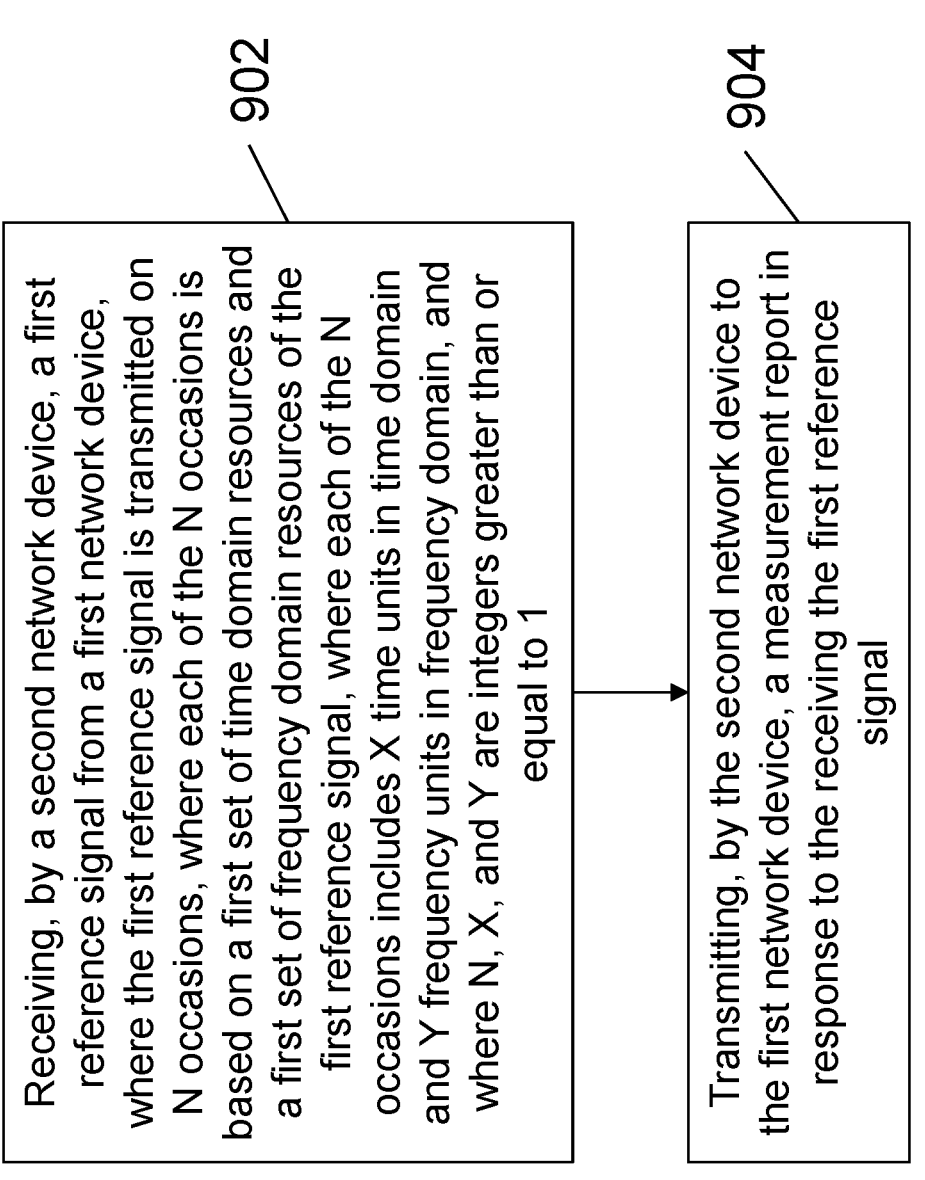

Receiving, by a second network device, a first reference signal from a first network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1

902

Transmitting, by the second network device to the first network device, a measurement report in response to the receiving the first reference signal

INTERFERENCE MEASUREMENT REFERENCE SIGNAL

CROSS-REFERENCE TO RELATED APPLICATION

This application is a continuation and claims priority to International Application No. PCT/CN2022/088865, filed on Apr. 24, 2022, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for configuration and/or transmission of reference signals that can enable a network device (e.g., base station) to reduce interference.

A first example wireless communication method includes transmitting, by a first network device, a first reference signal to a second network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1; and receiving, by the first network device from the second network device, a measurement report in response to the transmitting the first reference signal.

In some embodiments, the first reference signal includes an identifier of the first network device or of a cell of the first network device. In some embodiments, each of the N occasions is mapped to or is associated with a second reference signal that is transmitted by the first network device. In some embodiments, the second reference signal includes a channel state information reference signal (CSI-RS) or a synchronization signal block (SSB). In some embodiments, each of the N occasions is mapped to or is associated with: a transmission power for the transmitting the first reference signal, and/or a sub-band within which an occasion is located. In some embodiments, the first set of time domain resources associated with an occasion of the N occasions are based on a second set of time domain resources of a second reference signal that is transmitted by the first network device, and the second reference signal is mapped to the occasion for the first reference signal.

In some embodiments, time domain resources for an occasion for the first reference signal is based on an offset from a second reference signal to which the occasion for the first reference signal is mapped. In some embodiments, the first set of time domain resources for the N occasions are based on a second set of time domain resources of a plurality of second reference signals that are transmitted by the first network device, a plurality of occasions for the first reference signal are mapped with a same second reference signal, and the plurality of occasions for the first reference signal are in a same time slot. In some embodiments, the plurality of second reference signals or the second reference signal includes a channel state information reference signal (CSI-RS) or a synchronization signal block (SSB). In some embodiments, the first set of frequency domain resources associated with an occasion of the N occasions are based on a second set of frequency domain resources of a second reference signal that is transmitted by the first network device, and the second reference signal is mapped to the occasion for the first reference signal.

In some embodiments, the first set of frequency domain resources associated with an occasion of the N occasions are based on a frequency domain offset to a second reference signal that is transmitted by the first network device, and the second reference signal is mapped to the occasion for the first reference signal. In some embodiments, the first network device determines an index for each occasion of the N occasions based on: the first set of time domain resources and the first set of frequency domain resources; or an index of a second reference signal transmitted by the first network device, the first set of time domain resources and the first set of frequency domain resources; or a transmission power for the transmitting the first reference signal, the first set of time domain resources and the first set of frequency domain resources; or the index of the second reference signal, the transmission power, the first set of time domain resources and the first set of frequency domain resources.

In some embodiments, one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal. In some embodiments, indexes of a plurality of second reference signals transmitted by the first network device are mapped to the N occasions associated with the first reference signal in the following order: first, in a first order of a transmission power of the first reference signal on the N occasions, second, in increasing order of one or more frequency resource indexes for the first set of frequency domain resources of the first reference signal on the N occasions, and third, in an increasing order of one or more time resource indexes for the first set of time domain resources of the first reference signal on the N occasion. In some embodiments, the measurement report includes an index corresponding to an occasion associated with a transmission of the first reference signal, a measured interference strength of the first reference signal in the occasion is smaller than an interference strength measured of a second reference signal mapped to the occasion, and the second reference signal is transmitted by the first network device.

In some embodiments, the measurement report includes an index corresponding to an occasion associated with a transmission of the first reference signal, a measured interference strength of the first reference signal in the occasion is smaller than a threshold, the threshold is configured by or determined by the first network device, the second network device, or an operation, administration and management (OAM) device.

A second example wireless communication method includes receiving, by a second network device, a first reference signal from a first network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1; and transmitting, by the second network device to the first network device, a measurement report in response to the receiving the first reference signal.

In some embodiments, the first reference signal includes an identifier of the first network device or of a cell of the first network device. In some embodiments, each of the N occasions is mapped to or is associated with a second reference signal. In some embodiments, the second reference signal includes a channel state information reference signal (CSI-RS) or a synchronization signal block (SSB). In some embodiments, each of the N occasions is mapped to or is associated with: a transmission power for transmission of the first reference signal, and/or a sub-band within which an occasion is located. In some embodiments, the first set of time domain resources associated with an occasion of the N occasions are based on a second set of time domain resources of a second reference signal, and the second reference signal is mapped to the occasion for the first reference signal.

In some embodiments, time domain resources for an occasion for the first reference signal is based on an offset from a second reference signal to which the occasion for the first reference signal is mapped. In some embodiments, the first set of time domain resources for the N occasions are based on a second set of time domain resources of a plurality of second reference signals, a plurality of occasions for the first reference signal are mapped with a same second reference signal, and the plurality of occasions for the first reference signal are in a same time slot. In some embodiments, the plurality of second reference signals or the second reference signal includes a channel state information reference signal (CSI-RS) or a synchronization signal block (SSB). In some embodiments, the first set of frequency domain resources associated with an occasion of the N occasions are based on a second set of frequency domain resources of a second reference signal, and wherein the second reference signal is mapped to the occasion for the first reference signal.

In some embodiments, the first set of frequency domain resources associated with an occasion of the N occasions are based on a frequency domain offset to a second reference signal, and the second reference signal is mapped to the occasion for the first reference signal. In some embodiments, the an index for each occasion of the N occasions is based on: the first set of time domain resources and the first set of frequency domain resources; or an index of a second reference signal, the first set of time domain resources and the first set of frequency domain resources; or a transmission power for the transmitting the first reference signal, the first set of time domain resources and the first set of frequency domain resources; or the index of the second reference signal, the transmission power, the first set of time domain resources and the first set of frequency domain resources. In some embodiments, one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

In some embodiments, indexes of a plurality of second reference signals are mapped to the N occasions associated with the first reference signal in the following order: first, in a first order of a transmission power of the first reference signal on the N occasions, second, in increasing order of one or more frequency resource indexes for the first set of frequency domain resources of the first reference signal on the N occasions, and third, in an increasing order of one or more time resource indexes for the first set of time domain resources of the first reference signal on the N occasion. In some embodiments, the measurement report includes an index corresponding to an occasion associated with the first reference signal, a measured interference strength of the first reference signal in the occasion is smaller than an interference strength measured of a second reference signal mapped to the occasion, and the second reference signal is received by the second network device. In some embodiments, the measurement report includes an index corresponding to an occasion associated with the first reference signal, a measured interference strength of the first reference signal in the occasion is smaller than a threshold. In some embodiments, the first network device includes an aggressor base station that causes an interference experienced by the second network device that includes a victim base station.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

5

Figure 7:
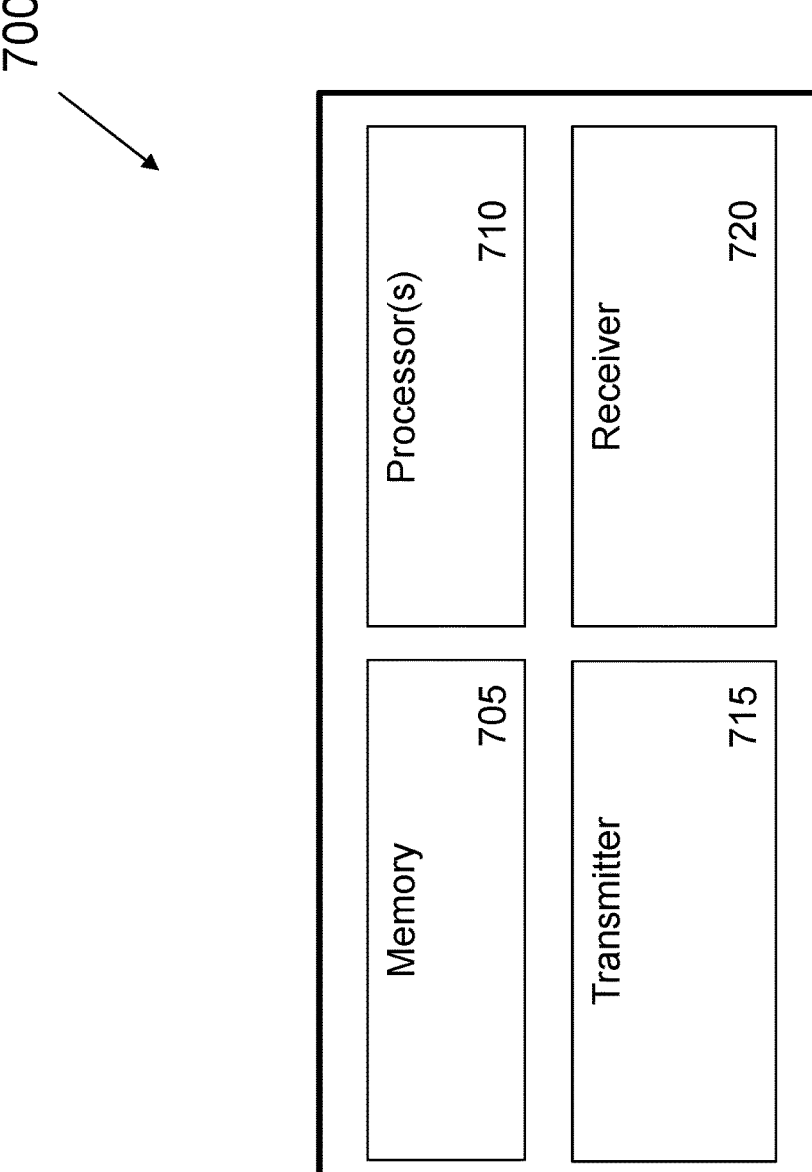

FIG. 7 shows an exemplary block diagram of a hardware platform that may be a part of a network device or a communication device.

FIG. 8 shows an exemplary flowchart for transmitting a reference signal and receiving a measurement report.

FIG. 9 shows an exemplary flowchart for receiving a reference signal and transmitting a measurement report.

DETAILED DESCRIPTION

In the existing NR system, various reference signals have been specified for measuring the interference between base station and User Equipment (UE) or between UE and UE, e.g., Channel State Information Reference Signal (CSI-RS) and Sounding Reference Signal (SRS). For interference measurement between base stations, only Remote Interference Management Reference Signal (RIM-RS) is defined. However, RIM-RS is mainly used for atmospheric ducting phenomenon and remote interference in time division duplex (TDD) network, which is inefficient for addressing the fast-changing interference between base stations in case of full duplex and dynamic TDD.

This patent document describes example techniques for reducing interference. For example, an aggressor base station can transmit reference signal 2 (RS2) on multiple occasions to the victim base station. Each RS2 occasion may be mapped/configured with different configurations (e.g., reference signal 0 (RS0), time domain resources, frequency domain resources or transmission power). Victim base station can measure the RS2 over these occasions and transmit the measurement report to the aggressor. The measurement report may include the interference strength for different occasions. Based on these measurement reports, the aggressor base station can adjust its beam direction, time domain resource, frequency domain resources and/or transmission power for future transmission to reduce the interference to the victim base station.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment #1: Example General Framework

The aggressor base station transmits reference signal RS2 to the victim base station. The victim base station measures the reference signal RS2 and sends measurement report to the aggressor base station. Thus, the aggressor base station can decide whether and how to adjust its transmission in order to reduce the interference between the aggressor base station and the victim base station.

The aggressor base station transmits the reference signal RS2 on N occasions (or N transmission occasions), where each occasion (or the time/frequency location of each occasion) is determined by the time domain resources and frequency domain resources of the RS2, and where each occasion contains X time units in time domain and Y frequency units in frequency domain. N, X and Y are integer numbers larger than 0. The time unit can be symbols, slots, subframes or frames. The frequency unit can be Resource Element (RE), Resource Block (RB), Bandwidth Part

6

(BWP) or sub-band. A sub-band contains parts of RBs within one BWP, where these RBs can be continuous and non-continuous. Typically, a sub-band contains multiple continuous RBs and there may be a gap in frequency domain between different sub-bands.

The time domain resources (i.e., X time units) and frequency domain resource (i.e., Y frequency units) for each occasion can be configured by the system information of the aggressor base station or configured by the OAM.

Reference signal RS2 carriers the Identification (ID) of the aggressor base station that transmits the RS-2 or ID of the cell used for transmitting the RS2 from the aggressor base station. The ID can be the physical cell ID of the cell transmitting RS2, the cell ID defined by the operator, the Cell ID configured by the OAM, or the base station ID defined by the operator.

Each occasion can be mapped with another signal RS0 transmitted by the aggressor base station. For example, one occasion can be mapped to one signal RS0 transmitted by the aggressor base station, or two or more occasions can be mapped to one signal RS0 transmitted by the aggressor base station. The RS0 can be CSI-RS or SSB (SS/PBCH block). The RS2 transmitted in the occasion is quasi co-located with the RS0. For example, based on this quasi co-location relationship, the aggressor base station can transmit the RS2 occasion with the same beam direction as that for the corresponding RS0. Each RS0 is mapped with P RS2 occasion, where P is integer number larger than 0.

The number P can be configured the system information of the aggressor base station, configured by the OAM, or specified in the specification.

The number N can be configured the system information of the aggressor base station, configured by the OAM, or specified in the specification.

In addition to that, each occasion can also be mapped with the following information:

1. A transmission power.

The transmission power can be configured by an absolute value. The transmission power can also be indicated as an offset to the transmission power of the RS0 mapped with this occasion. The aggressor base station transmits RS2 in this occasion with this transmission power.

In some embodiments, each occasion can be mapped with (or associated with) a transmission power so that two or more occasions can have different transmission power or at least two occasions can have a same transmission power. For example, a first occasion can be associated with a first transmission power that is different than a second transmission power associated with a second occasion. In another example, the first and second occasions can have the same transmission power assigned to them.

2. A sub-band.

The occasion is within this sub-band. The aggressor base station and victim base station may use the bandwidth of this sub-band to derive the frequency resource of this occasion.

In some embodiments, each occasion can be mapped with (or associated with) a sub-band so that two or more occasions can be within different sub-bands or at least two occasions can be within a same sub-band. For example, a first occasion can be within a first sub-band that is different than a second sub-band within which a second occasion is located. In another example, the first and second occasions can be within a same sub-band.

II. Embodiment #2: Example Time Domain Resource for RS2 Occasion

In some embodiments, the time domain resources (i.e., X time units) for the RS2 occasion are determined based on the time domain resources of the RS0 mapped with the RS2 occasion. The time domain resources for the RS2 occasion are derived by the time domain offset to the RS0 mapped with the RS2 occasion. The time domain offset can be in the units of slots and/or in the units of symbols. The reference of the time domain offset can be the start of the RS0, the end of the RS0 or the start of the slot containing the RS0. The time domain offset is configured by the system information of the aggressor base station or configured by the OAM. The RS2 occasions can be configured with the same or different time domain offsets.

Figure 1:
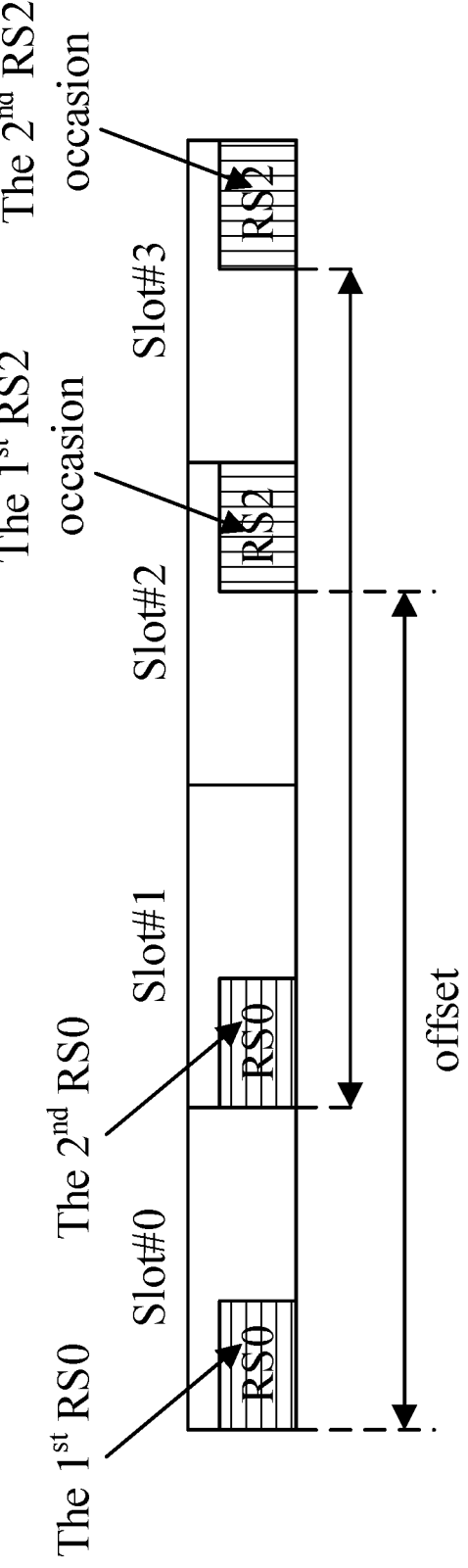
FIG. 1 shows an example mapping between two reference signal 0 (RS0) and two reference signal 2 (RS2).

As an example, in FIG. 1, the 1st RS2 occasion is mapped with the first RS0 and the 2nd RS2 occasion is mapped with the 2nd RS0. The 1st RS0 and 2nd RS0 are transmitted in the first 4 symbols Slot #0 and Slot #1, respectively. If the time domain offset is configured as 2 slot and 7 symbols and the reference for this time domain offset is the start of the corresponding RS0, then the 1st RS2 occasion and the 2nd RS2 occasion will be transmitted from the 7th symbol in Slot #2 and Slot #3, respectively.

In some embodiments, all the P RS2 occasions mapped with the same RS0 are in the same slot.

In another embodiment, all the P RS2 occasions satisfy one of the following.

The start of all the P RS2 occasions is aligned with the start of the RS0 mapped with these P RS2 occasion.

The end of all the P RS2 occasions is aligned with the end of the RS0 mapped with these P RS2 occasion.

The middle of all the P RS2 occasions is aligned with the middle of the RS0 mapped with these P RS2 occasion.

Figure 2:
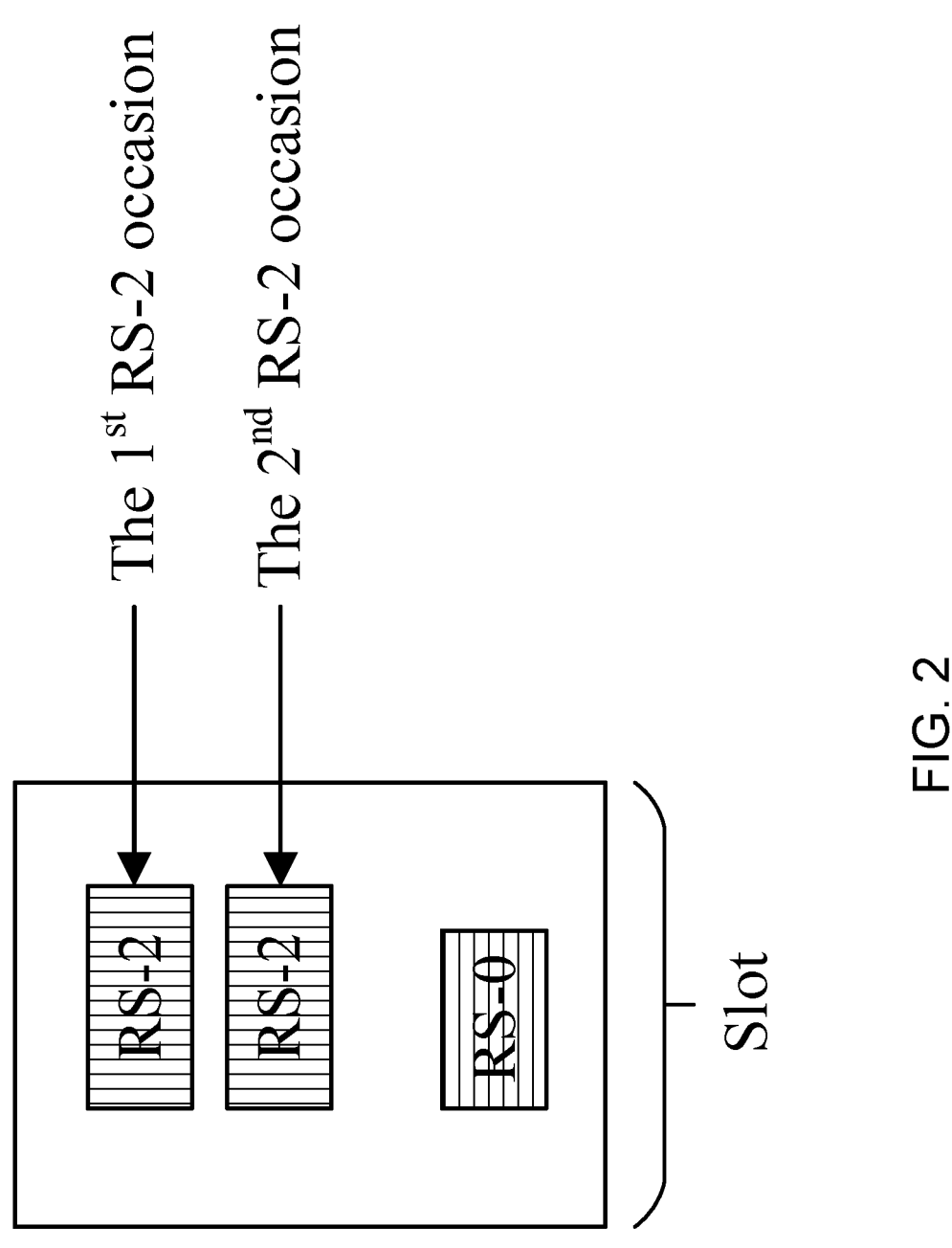
FIG. 2 shows an example mapping between two RS2 and a RS0 in a same time slot.

For example, in FIG. 2, two RS2 occasions are mapped with the RS0. The two RS2 occasions are in the same slot as the RS0 and the start of two RS2 occasions is aligned with the start of the RS0.

Among the N RS2 occasions, there are P1 different time resources for these RS2 occasions, where P1 is integer number larger than 0 and P1 is not larger than N.

If the period is T, aggressor base station and victim base station determine the start of the time domain resources for RS2 occasions as $$S = \left\lfloor \frac{T*(k+\Delta)}{P1} \right\rfloor$$

or $$S = \left\lceil \frac{T*(k+\Delta)}{P1} \right\rceil,$$

where k=0, 1, . . . , P1–1. S is the start of the time domain resources for RS2 occasions. Δ is the offset configured by the system information of the aggressor base station, configured by the OAM or specified in the specification to adjust the starting time, where 0≤Δ≤1 and typical value for Δ is 0.5. The period T is the period of RS0 (e.g., length of time when one or more RS0 is transmitted), the slot configuration period for TDD for the aggressor base station or a time window for transmission of the RS2 configured by the aggressor base station or the OAM. If the RS0 is SSB, then the typical value of period T can be 20 ms. The starting time may be in the units of subframes, slots or symbols.

If there are P2 RS2 occasions for each different time resources for RS2 occasion, then we have P1*P2=P, where P2 is integer number larger than 0 and P2 is not larger than P. P1 can be the number of locations in time domain for RS2, and P2 can be the number of occasions in frequency domain for RS2. If the RS2 occasion is indexed first, in increasing order of frequency resource indexes for frequency domain resources of RS2 occasion, and second, in increasing order of time resource indexes for time domain resources of RS2 occasion, then for the RS2 occasion with index k (index starting from 0), its starting time is $$S_k = \left\lfloor \frac{T*\left( \left\lfloor \frac{k}{P2} \right\rfloor + \Delta \right)}{P1} \right\rfloor$$

or $$S_k = \left\lceil \frac{T*\left( \left\lfloor \frac{k}{P2} \right\rfloor + \Delta \right)}{P1} \right\rceil,$$

where k=0, 1, . . . , N–1.

The period T is the period of RS0 (e.g., length of time when one or more RS0 is transmitted), the slot configuration period for TDD for the aggressor base station or a time window for transmission of the RS2 configured by the aggressor base station or the OAM. The starting reference of starting time for each occasion determined by the above S or $S_k$ is the start of each period T.

Different methods mentioned in this embodiment can be combined together to determine the time resources for RS2 occasion. For example, the above S or S k is used to determine the slot index for the time resources, and then within the determined slot, RS2 occasion occupies the same symbols as the RS0 mapped with the RS2 occasion.

Figure 3:
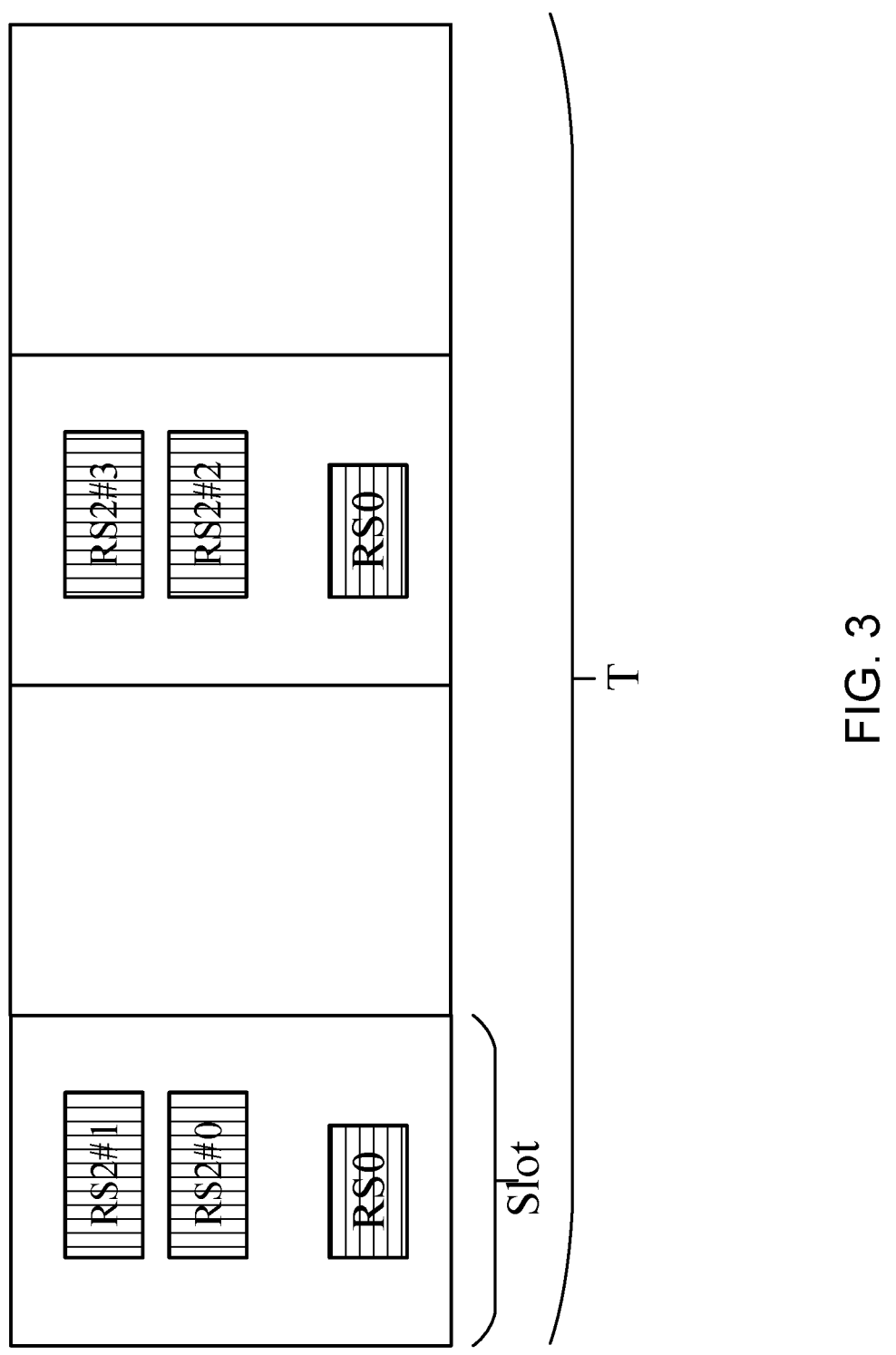
FIG. 3 shows an example mapping between two RS2 and a RS0 in one time slot, and two other RS2 and RS0 in another time slot.

For example, in FIG. 3, RS2 occasion 0 (RS2 #0) and RS2 occasion 1 (RS2 #1) in slot #0 are mapped with RS0 in slot #0. RS2 occasion 2 (RS2 #2) and RS2 occasion 3 (RS2 #3) in slot #2 are mapped with RS0 in slot #2. The period of RS0 is T and T is 4 slots. There are 4 RS2 occasions in total and there are two different time domain resources for RS2 occasions (one in the first slot and another one in the third slot), i.e., P=4, P1=2. There are 2 RS2 occasions for each time resources, i.e., P2=2. By setting Δ as 0 and using $$S_k = \left\lfloor \frac{T*\left\lfloor \frac{k}{P2} + \Delta \right\rfloor}{P1} \right\rfloor,$$

we can derive that the starting time for RS2 occasion 0 (RS2 #0) and RS2 occasion 1 (RS2 #1) is 0 and the starting time for RS2 occasion 2 (RS2 #2) and RS2 occasion 3 (RS2 #3) is 2. The starting symbol of RS2 occasions is aligned with the corresponding RS0.

In another embodiment, the time domain resources for the RS2 occasion are derived by the time domain offset to the start of the frame or slot or sub-frame. The time domain offset can be in the units of slots and/or in the units of symbols. The RS2 occasions can be configured with the same or different time domain offsets.

III. Embodiment #3: Frequency Domain Resource for RS2 Occasion

In some embodiments, the frequency domain resources (i.e., Y frequency units) for the RS2 occasion are determined based on the frequency domain resources of the RS0 mapped with the RS2 occasion. The frequency domain resources for the RS2 occasion are derived by the frequency domain offset to the RS0 mapped with the RS2 occasion. The frequency domain offset can be in the units of RB and/or in the units of RE. The reference of the frequency domain offset can be the start RB/RE of the RS0, the last RB/RE of the RS0 or the middle RB/RE of the RS0.

Figure 4:
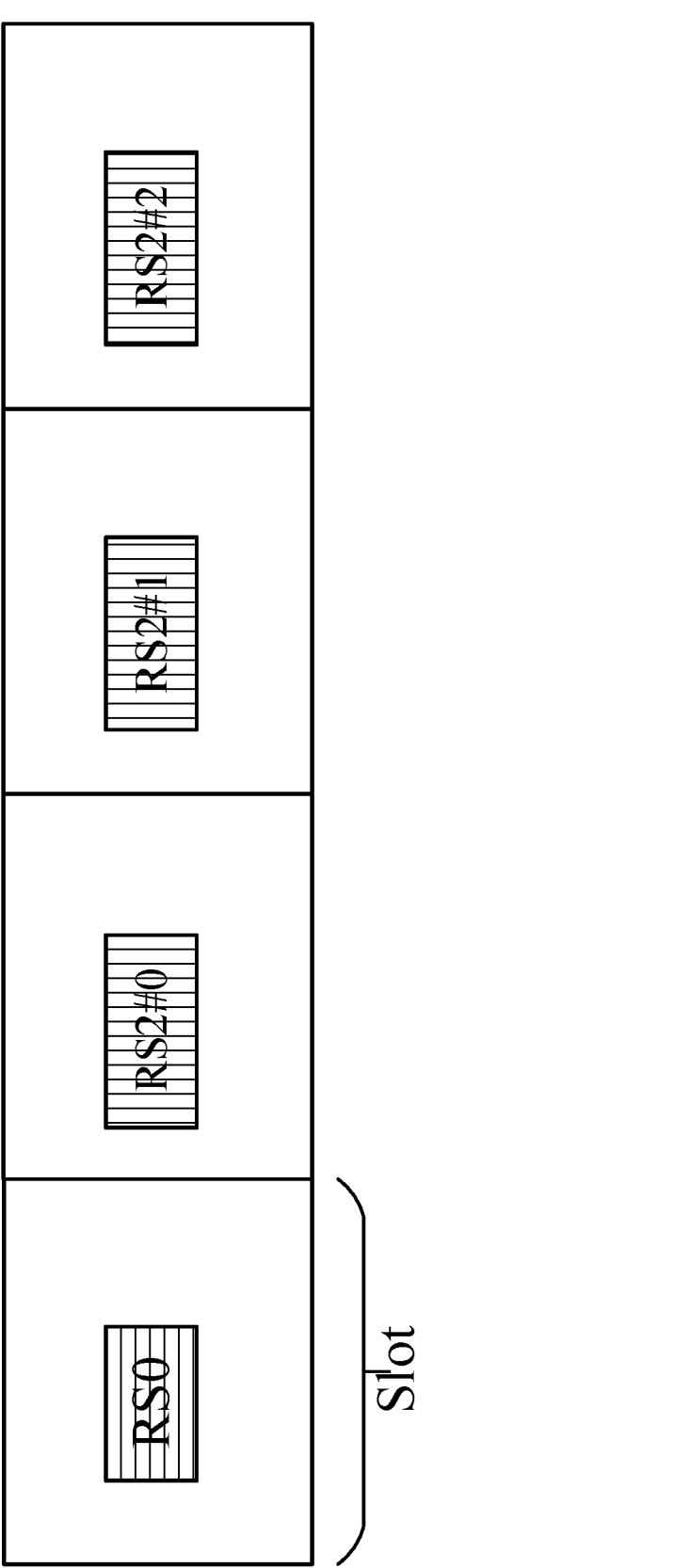
FIG. 4 shows an example mapping between three RS2 occasions and RS0 in a first slot, where the three RS2 occasions occupy same frequency resources as RS0 in the first slot.

In some embodiments, the RS2 occasion occupies the same frequency resources as the RS0 mapped with the RS2 occasion. For example, in FIG. 4, all the three RS2 occasions (RS2 #0, RS2 #1 and RS2 #2) are mapped to RS0 in the first slot and they occupy the same frequency resources as RS0 in the first slot.

In some embodiments, the start of RS2 occasion in frequency domain is the same as the start of the RS0 in frequency domain. In some embodiments, the middle of RS2 occasion in frequency domain is the same as the middle of the RS0 in frequency domain. In some embodiments, the end of RS2 occasion in frequency domain is the same as the end of the RS0 in frequency domain.

In another embodiment, the frequency domain resources of RS2 occasion are configured by the system information of the aggressor base station or configured by the OAM via a frequency domain offset and Y frequency units. The frequency domain offset is an offset to the start of the BWP, the first RB/RE of the BWP, the first RE/RB of the corresponding sub-band mapped with this RS2 occasion, common RB 0, start of the carrier or Point A of the corresponding carrier.

Among the N RS2 occasions, there are P2 different frequency domain resources, where P2 is integer number larger than 0 and P2 is not larger than N.

If the bandwidth is B, aggressor base station and victim base station determine the start of the frequency resources for RS2 occasions as $$S = \left\lfloor \frac{B * (\bmod(k, P2) + \Delta)}{P2} \right\rfloor$$

or $$S = \left\lceil \frac{B * (\bmod(k, P2) + \Delta)}{P2} \right\rceil,$$

where k=0, 1, . . . , N−1. S is the start of the frequency resources for RS2 occasions. $\Delta$ is the offset configured by the system information of the aggressor base station, configured by the OAM or specified in the specification to adjust the starting time, where $0 \leq \Delta \leq 1$ and typical value for $\Delta$ is 0.5. The start of the frequency domain resources may be in the units of RE or RB.

The bandwidth B is the bandwidth of the bandwidth part, carrier or the sub-band mapped with these RS2 occasions. Alternatively, it can also be a frequency window for transmission of the RS2 configured by the aggressor base station or the OAM. The starting reference of start of the frequency resources for each occasion determined by the above S or $S_k$ is the start of the bandwidth part, carrier, sub-band or the frequency window. The frequency window may include multiple continuous RBs or Res within a BWP.

IV. Embodiment #4: Time Domain Resource & Frequency Domain Resource for RS2 Occasion Different methods for determining the time domain resources for RS2 occasion as mentioned in embodiment #2 and different methods for determining the frequency domain resources for RS2 occasion as mentioned in embodiment #3 can be combined together to determine the resources for RS2 occasion.

Figure 5:
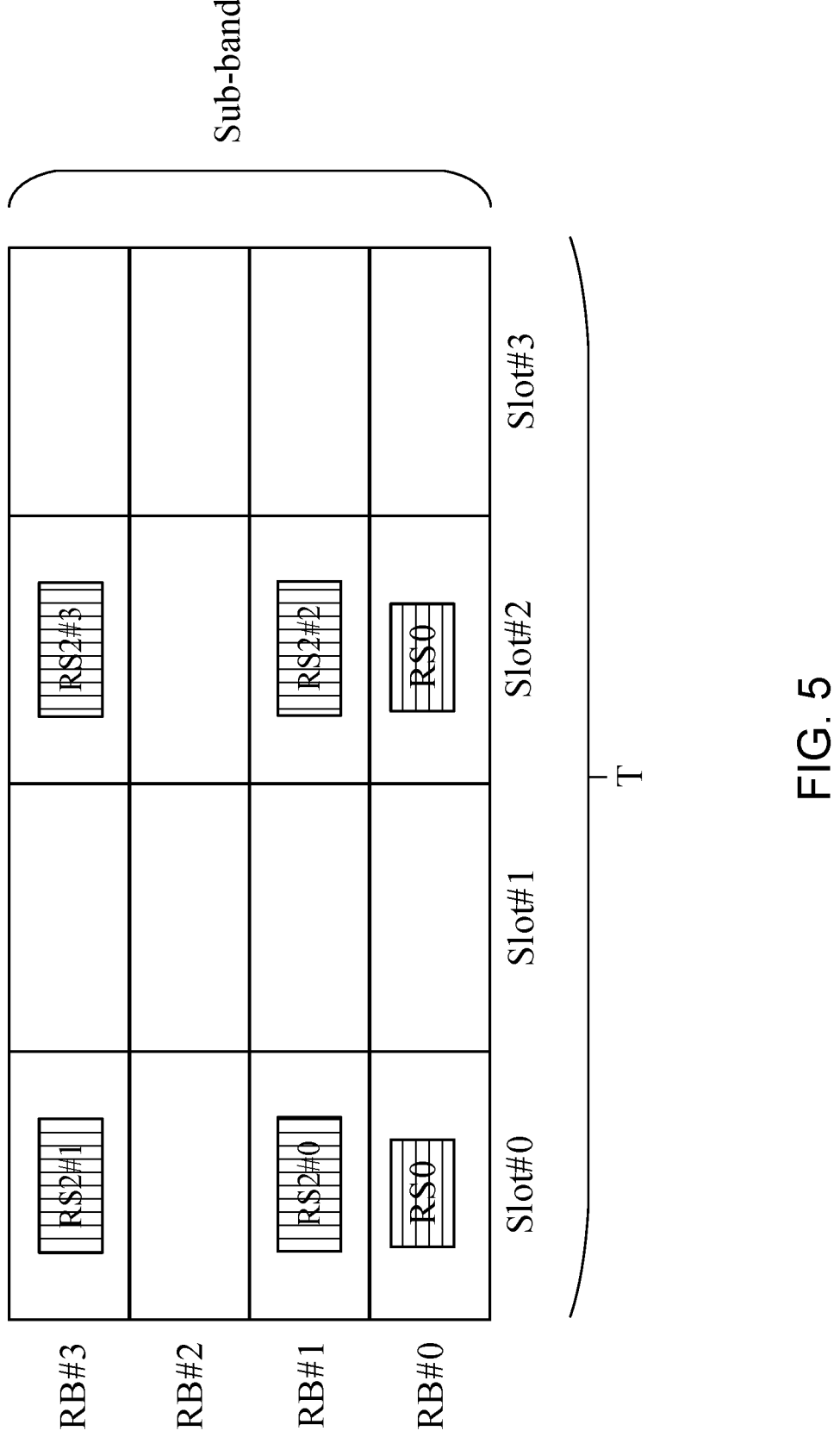
FIG. 5 shows an example mapping between two RS2 occasions and RS0 in a first time slot, and two RS2 occasions and RS0 in a third time slot, where two of the RS2 (RS2 #0 and RS2 #2) use same first frequency resources, and where the remaining two of the RS2 (RS2 #1 and RS2 #3) use same second frequency resources.

For example, in FIG. 5, RS2 occasion 0 (RS2 #0) and RS2 occasion 1 (RS2 #1) in slot #0 are mapped with RS0 in slot #0. RS2 occasion 2 (RS2 #2) and RS2 occasion 3 (RS2 #3) in slot #2 are mapped with RS0 in slot #2. The period of RS0 is T and T is 4 slots. There are 4 RS2 occasions in total and there are two different time resources for RS2 occasions (one in the first slot and another one in the third slot), i.e., P=4, P1=2. There are 2 RS2 occasions for each time resources, i.e., P2=2. By setting $\Delta$ as 0 and using $$S_k = \left\lfloor \frac{T * \left\lfloor \frac{k}{P2} + \Delta \right\rfloor}{P1} \right\rfloor,$$

we can derive that the time resources for RS2 occasion 0 (RS2 #0) and RS2 occasion 1 (RS2 #1) is slot #0 and the time resources for RS2 occasion 2 (RS2 #2) and RS2 occasion 3 (RS2 #3) is slot #2. The starting symbol of RS2 occasions are aligned with the corresponding RS0.

The sub-band has 4 RBs, e.g., RB #0, RB #1, RB #2 and RB #3. The OAM configures the frequency domain offset to the RS0 as 1 for RS2 #0 and RS2 #2, and configures the frequency domain offset to the RS0 as 3 for RS2 #1 and RS2 #3.

V. Embodiment #5: Index of RS2 Occasion

Each RS2 occasion is mapped with an occasion index. The aggressor base station or OAM configures index for each RS2 occasion.

Alternatively, the aggressor base station or OAM doesn't configure index for the RS2 occasion. Instead, the aggressor base station and victim base station can determine the index for each RS2 occasion based on the one of the following.

Alt. 1. Time domain resources and frequency domain resources;

Alt. 2. Index of RS0 mapped with the corresponding RS2 occasion, time domain resources and frequency domain resources;

Alt. 3. Transmission power, time domain resources and frequency domain resources;

Alt. 4. Index of RS0 mapped with the corresponding RS2 occasion, transmission power, time domain resources and frequency domain resources;

In some embodiments, if Alt. 1 is used, the RS2 occasions are indexed in the following order:

1. First, in increasing order of frequency resource indexes for frequency domain resources of RS2 occasion;

2. Second, in increasing order of time resource indexes for time domain resources of RS2 occasion.

For example, in FIG. 5, there are four RS2 occasions, e.g., RS2 #0, RS2 #1, RS2 #2 and RS2 #3. Following the above rule, the index for RS2 #0, RS2 #1, RS2 #2 and RS2 #3 will be 0, 1, 2 and 3, respectively.

In another embodiment, if Alt. 1 is used, the RS2 occasions are indexed in the following order:

1. First, in increasing order of time resource indexes for time domain resources of RS2 occasion.

2. Second, in increasing order of frequency resource indexes for frequency domain resources of RS2 occasion;

In some embodiments, if Alt. 2 is used, the RS2 occasions are indexed in the following order:

1. First, in increasing order of frequency resource indexes for frequency domain resources of RS2 occasion;
2. Second, in increasing order of time resource indexes for time domain resources of RS2 occasion.
3. Third, in increasing order of the index of RS0 mapped with the corresponding RS2 occasion.

In another embodiment, if Alt. 2 is used, the RS2 occasions are indexed in the following order:

1. First, in increasing order of the index of RS0 mapped with the corresponding RS2 occasion.
2. Second, in increasing order of frequency resource indexes for frequency domain resources of RS2 occasion;
3. Third, in increasing order of time resource indexes for time domain resources of RS2 occasion.

In some embodiments, if Alt. 3 is used, the RS2 occasions are indexed in the following order:

1. First, in increasing order of frequency resource indexes for frequency domain resources of RS2 occasion;
2. Second, in increasing order of time resource indexes for time domain resources of RS2 occasion.
3. Third, in increasing (or decreasing) order of the transmission power of RS2 occasion.

In another embodiment, if Alt. 3 is used, the RS2 occasions are indexed in the following order:

1. First, in increasing (or decreasing) order of the transmission power of RS2 occasion.
2. Second, in increasing order of frequency resource indexes for frequency domain resources of RS2 occasion;
3. Third, in increasing order of time resource indexes for time domain resources of RS2 occasion.

In some embodiments, if Alt. 4 is used, the RS2 occasions are indexed in the following order:

1. First, in increasing order of frequency resource indexes for frequency domain resources of RS2 occasion;
2. Second, in increasing order of time resource indexes for time domain resources of RS2 occasion.
3. Third, in increasing (or decreasing) order of the transmission power of RS2 occasion.
4. Fourth, in increasing order of the index of RS0 mapped with the corresponding RS2 occasion.

In another embodiment, if Alt. 4 is used, the RS2 occasions are indexed in the following order:

1. First, in increasing order of frequency resource indexes for frequency domain resources of RS2 occasion;
2. Second, in increasing order of time resource indexes for time domain resources of RS2 occasion.
3. Third, in increasing order of the index of RS0 mapped with the corresponding RS2 occasion.
4. Fourth, in increasing (or decreasing) order of the transmission power of RS2 occasion.

In another embodiment, if Alt. 4 is used, the RS2 occasions are indexed in the following order:

1. First, in increasing (or decreasing) order of the transmission power of RS2 occasion.
2. Second, in increasing order of the index of RS0 mapped with the corresponding RS2 occasion.
3. Third, in increasing order of frequency resource indexes for frequency domain resources of RS2 occasion;
4. Fourth, in increasing order of time resource indexes for time domain resources of RS2 occasion.

In another embodiment, if Alt. 4 is used, the RS2 occasions are indexed in the following order:

1. First, in increasing order of the index of RS0 mapped with the corresponding RS2 occasion.

2. Second, in increasing (or decreasing) order of the transmission power of RS2 occasion.
3. Third, in increasing order of frequency resource indexes for frequency domain resources of RS2 occasion;
4. Fourth, in increasing order of time resource indexes for time domain resources of RS2 occasion.

VI. Embodiment #6: RS2 Occasions Mapped with the Same RS0

Each RS0 is mapped with P RS2 occasion, where P is integer number larger than 0. The number P can be configured by the system information of the aggressor base station or configured by the OAM. The aggressor base station and victim base station determine the P RS2 occasions for each RS0 by the index of RS2 occasions. The first P RS2 occasions are mapped to the first RS0, the second P RS2 occasions are mapped to the second RS0, and so on.

In some embodiments, the P RS2 occasions are indexed in the following order:

1. First, in increasing order of frequency resource indexes for frequency domain resources of RS2 occasion;
2. Second, in increasing order of time resource indexes for time domain resources of RS2 occasion.

For example, in FIG. 5, each RS0 is mapped with two RS2 occasions. Following above rule, RS2 #0 and RS2 #1 with index 0 and 1, respectively, will be mapped with the first RS0 in slot #0. RS2 #2 and RS2 #3 with index 2 and 3, respectively, will be mapped with the second RS0 in slot #2. The RS0 is also configured with an index or mapped with an index.

In another embodiment, the P RS2 occasions are indexed in the following order:

1. First, in increasing order of time resource indexes for time domain resources of RS2 occasion.
2. Second, in increasing order of frequency resource indexes for frequency domain resources of RS2 occasion;

In another embodiment, the P RS2 occasions are indexed in the following order:

1. First, in increasing order of frequency resource indexes for frequency domain resources of RS2 occasion;
2. Second, in increasing order of time resource indexes for time domain resources of RS2 occasion.
3. Third, in increasing (or decreasing) order of the transmission power of RS2 occasion.

In another embodiment, the P RS2 occasions are indexed in the following order:

1. First, in increasing (or decreasing) order of the transmission power of RS2 occasion.
2. Second, in increasing order of frequency resource indexes for frequency domain resources of RS2 occasion;
3. Third, in increasing order of time resource indexes for time domain resources of RS2 occasion.

In some embodiments, the indexes of RS0 are mapped to the RS2 occasions in the following order.

1. First, in increasing order of frequency resource indexes for frequency domain resources of RS2 occasion;
2. Second, in increasing order of time resource indexes for time domain resources of RS2 occasion.

In some embodiment, the indexes of RS0 are mapped to the RS2 occasions in the following order.

1. First, in increasing order of time resource indexes for time domain resources of RS2 occasion.

2. Second, in increasing order of frequency resource indexes for frequency domain resources of RS2 occasion;

In some embodiment, the indexes of RS0 are mapped to the RS2 occasions in the following order.

1. First, in increasing order of frequency resource indexes for frequency domain resources of RS2 occasion;

2. Second, in increasing order of time resource indexes for time domain resources of RS2 occasion.

3. Third, in increasing (or decreasing) order of the transmission power of RS2 occasion.

In some embodiment, the indexes of RS0 are mapped to the RS2 occasions in the following order.

1. First, in increasing (or decreasing) order of the transmission power of RS2 occasion.

2. Second, in increasing order of frequency resource indexes for frequency domain resources of RS2 occasion;

3. Third, in increasing order of time resource indexes for time domain resources of RS2 occasion.

In some embodiment, each RS0 is mapped with P RS2 occasions (or P RS2 occasions are mapped with one RS0), where P is integer number larger than 0. Then the Pt RS0 is mapped to the first P RS2 occasions $(RS2_0, RS2_1, \ldots, RS2_{P-1})$, then $2^{nd}$ RS0 is mapped to the second P RS2 occasions $(RS2_P, RS2_{P+1}, \ldots, RS2_{2P-1})$, and etc. In other words, the $k_{th}$ RS0 is mapped to the $k^{th}$ P RS2 occasions $(RS2_{(k-1)P}, RS2_{(k-1)P+1}, \ldots, RS2_{kP})$. The subscript of RS2 is the index of RS2 occasion, e.g., $RS2_P$ refers to the RS2 occasion with index P.

In some embodiment, each RS0 is mapped with P RS2 occasions (or P RS2 occasions are mapped with one RS0), where P is integer number larger than 0. Then the $1^{st}$ RS0 is mapped to the P RS2 occasions with index 0, Q, . . . , $(P-1) \cdot Q$, i.e., $RS2_0, RS2_Q, \ldots, RS2_{(P-1) \cdot Q}$. The $2^{nd}$ RS0 is mapped the P RS2 occasions with index 1, Q+1, . . . , $(P-1) \cdot Q+1$, i.e., $RS2_1, RS2_{Q+1}, \ldots, RS2_{(P-1) \cdot Q+1}$, and etc. In other words, the $k^{th}$ RS0 is mapped to the P RS2 occasions with index k-1, Q+k-1, . . . , $(P-1) \cdot Q+k-1$, i.e., $RS2_{k-1}, RS2_{Q+k-1}, \ldots, RS2_{(P-1) \cdot Q+k-1}$. The subscript of RS2 is the index of RS2 occasion, e.g., $RS2_P$ refers to the RS2 occasion with index P.

VII. Embodiment #7: Window for RS2 Occasions

Aggressor base station or the OAM configures one or multiple windows for RS2 occasions, for the RS2 occasions within one window, at least one of the following should be met.

1. All the RS2 occasions within the window are in the same slot;

2. All the RS2 occasions within the window occupy the same time domain resources within a slot, e.g., they occupy the same symbols but can be in different slots;

3. All the RS2 occasions within the window occupy the same frequency domain resources;

4. All the RS2 occasions within the window are mapped with the same RS0.

The victim base station measures the RS2 occasions within each occasion and can filter the measurement results of the RS2 occasions within the same window. The measurement can be RSRP (Reference Signal Received Power), RSSI (Received Signal Strength Indicator) and/or RSRQ (Reference Signal Received Quality).

In some embodiments, the victim base station filter the measurement results of the RS2 occasions that occupy the same frequency domain resources.

In another embodiment, the victim base station filter the measurement results of the RS2 occasions that are in the same slot.

In another embodiment, the victim base station filter the measurement results of the RS2 occasions that occupy the same time domain resources within a slot.

In another embodiment, the victim base station filter the measurement results of the RS2 occasions that are mapped with the same RS0.

VIII. Embodiment #8: Measurement Report from the Victim Base Station

The aggressor base station transmits RS2 with N occasions to the victim base station. The victim base station measures the RS2 and transmits measurement report to the aggressor base station. The measurement report includes one of the following.

Alt. 1 The RS2 occasion index(es), in which the measured interference strength is smaller than the interference strength measured in the RS0 mapped with the RS2 occasion.

Alt. 2 The RS2 occasion index(es), in which the measured interference strength is smaller than the threshold. The threshold is configured by aggressor base station or victim base station, configured by the OAM or determined by the victim base station.

Alt. 3 The M RS2 occasion index(es), in which the measured interference strength is smaller than the other N-M RS2 occasions. M is integer number larger than 0 and M is not larger than N.

Alt. 4 The Q RS2 occasion index(es) among the RS2 occasions that are mapped with the same RS0, in which the measured interference strength is smaller than the other P-Q RS2 occasions. Q is integer number larger than 0 and Q is not larger than P. One RS0 is mapped with P RS2 occasions.

In addition to the above RS2 occasion index(es), the victim base station can report the corresponding interference strength for these RS2 occasion index(es) in the measurement report. The interference strength can be RSRP, RSSI or RSRQ.

The victim base station transmits the measurement report to the aggressor base station via signalling or physical channel/signals.

IX. Embodiment #9: An Example

The victim base station configures 8 RS2 occasions. Each RS occasion is mapped/configured with different configurations. Once victim base station measures RS2 on these RS2 occasions and transmits measurement report to the aggressor base station, e.g., indicating the best 2 RS2 occasions. Then the aggressor base station can adjust its transmission beam, time domain resources, frequency domain resources or transmission power based on the measurement report.

| RS2 occasion index | Configurations |
|---|---|
| 1 | 1) Mapped with RS0#0;<br>2) Time domain resources: the first 4 symbols of slot#0;<br>3) Frequency domain resources: the first 4 RBs;<br>4) Transmission power: 30 dBm |

-continued

| RS2 occasion index | Configurations |
|---|---|
| 2 | 1) Mapped with RS0#0;<br>2) Time domain resources: the first 4 symbols of slot#0;<br>3) Frequency domain resources: the last 4 RBs;<br>4) Transmission power: 30 dBm |
| 3 | 1) Mapped with RS0#0;<br>2) Time domain resources: the first 4 symbols of slot#0;<br>3) Frequency domain resources: the first 4 RBs;<br>4) Transmission power: 27 dBm |
| 4 | 1) Mapped with RS0#0;<br>2) Time domain resources: the first 4 symbols of slot#0;<br>3) Frequency domain resources: the last 4 RBs;<br>4) Transmission power: 27 dBm |
| 5 | 1) Mapped with RS0#1;<br>2) Time domain resources: the first 4 symbols of slot#0;<br>3) Frequency domain resources: the first 4 RBs;<br>4) Transmission power: 30 dBm |
| 6 | 1) Mapped with RS0#1;<br>2) Time domain resources: the first 4 symbols of slot#0;<br>3) Frequency domain resources: the last 4 RBs;<br>4) Transmission power: 30 dBm |
| 7 | 1) Mapped with RS0#1;<br>2) Time domain resources: the first 4 symbols of slot#0;<br>3) Frequency domain resources: the first 4 RBs;<br>4) Transmission power: 27 dBm |
| 8 | 1) Mapped with RS0#1;<br>2) Time domain resources: the first 4 symbols of slot#0;<br>3) Frequency domain resources: the last 4 RBs;<br>4) Transmission power: 27 dBm |

Figure 6:
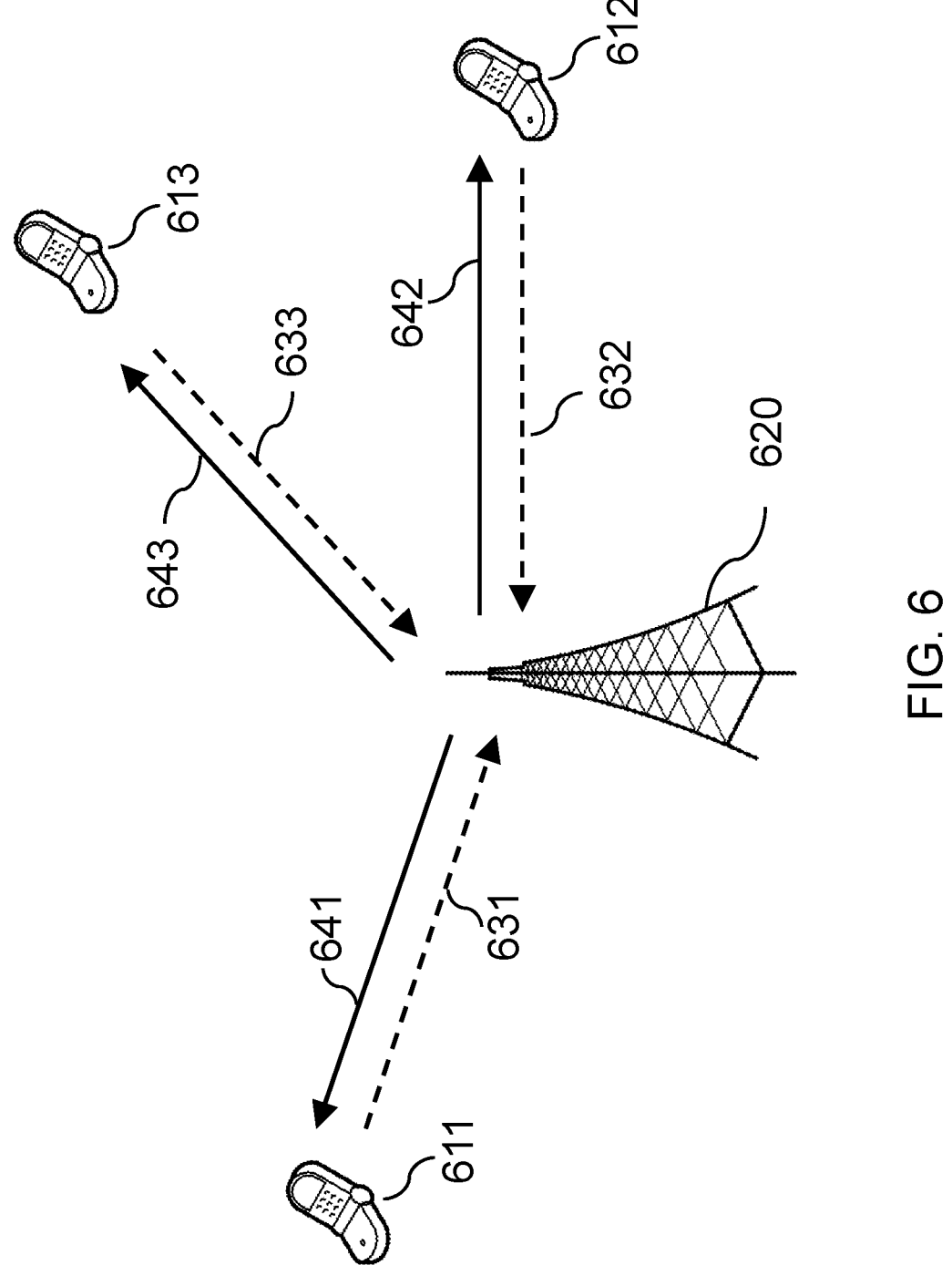
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 700 to perform the operations described in FIGS. 1 to 6 and 8 to 9 and in the various embodiments described in this patent document. The transmitter 515 transmits or sends information or data to another device. For example, a network device transmitter can send a message to a user equipment. The receiver 520 receives information or data transmitted or sent by another device. For example, a user equipment can receive a message from a network device.

FIG. 8 shows an exemplary flowchart for transmitting a reference signal and receiving a measurement report. Operation 802 includes transmitting, by a first network device, a first reference signal to a second network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1. Operation 804 includes receiving, by the first network device from the second network device, a measurement report in response to the transmitting the first reference signal.

In some embodiments, the first reference signal includes an identifier of the first network device or of a cell of the first network device. In some embodiments, each of the N occasions is mapped to or is associated with a second reference signal that is transmitted by the first network device. In some embodiments, the second reference signal includes a channel state information reference signal (CSI-RS) or a synchronization signal block (SSB). In some embodiments, each of the N occasions is mapped to or is associated with: a transmission power for the transmitting the first reference signal, and/or a sub-band within which an occasion is located. In some embodiments, the first set of time domain resources associated with an occasion of the N occasions are based on a second set of time domain resources of a second reference signal that is transmitted by the first network device, and the second reference signal is mapped to the occasion for the first reference signal.

In some embodiments, time domain resources for an occasion for the first reference signal is based on an offset from a second reference signal to which the occasion for the first reference signal is mapped. In some embodiments, the first set of time domain resources for the N occasions are based on a second set of time domain resources of a plurality of second reference signals that are transmitted by the first network device, a plurality of occasions for the first reference signal are mapped with a same second reference signal, and the plurality of occasions for the first reference signal are in a same time slot. In some embodiments, the plurality of second reference signals or the second reference signal includes a channel state information reference signal (CSI-RS) or a synchronization signal block (SSB). In some embodiments, the first set of frequency domain resources associated with an occasion of the N occasions are based on a second set of frequency domain resources of a second reference signal that is transmitted by the first network device, and the second reference signal is mapped to the occasion for the first reference signal.

In some embodiments, the first set of frequency domain resources associated with an occasion of the N occasions are based on a frequency domain offset to a second reference signal that is transmitted by the first network device, and the second reference signal is mapped to the occasion for the first reference signal. In some embodiments, the first network device determines an index for each occasion of the N occasions based on: the first set of time domain resources and the first set of frequency domain resources; or an index of a second reference signal transmitted by the first network device, the first set of time domain resources and the first set of frequency domain resources; or a transmission power for the transmitting the first reference signal, the first set of time domain resources and the first set of frequency domain resources; or the index of the second reference signal, the transmission power, the first set of time domain resources and the first set of frequency domain resources.

In some embodiments, one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal. In some embodiments, indexes of a plurality of second reference signals transmitted by the first network device are mapped to the N occasions associated with the first reference signal in the following order: first, in a first order of a transmission power of the first reference signal on the N occasions, second, in increasing order of one or more frequency resource indexes for the first set of frequency domain resources of the first reference signal on the N occasions, and third, in an increasing order of one or more time resource indexes for the first set of time domain resources of the first reference signal on the N occasion. In some embodiments, the measurement report includes an index corresponding to an occasion associated with a transmission of the first reference signal, a measured interference strength of the first reference signal in the occasion is smaller than an interference strength measured of a second reference signal mapped to the occasion, and the second reference signal is transmitted by the first network device.

In some embodiments, the measurement report includes an index corresponding to an occasion associated with a transmission of the first reference signal, a measured interference strength of the first reference signal in the occasion is smaller than a threshold, the threshold is configured by or determined by the first network device, the second network device, or an operation, administration and management (OAM) device.

FIG. 9 shows an exemplary flowchart for receiving a reference signal and transmitting a measurement report. Operation 902 includes receiving, by a second network device, a first reference signal from a first network device, where the first reference signal is transmitted on N occasions, where each of the N occasions is based on a first set of time domain resources and a first set of frequency domain resources of the first reference signal, where each of the N occasions includes X time units in time domain and Y frequency units in frequency domain, and where N, X, and Y are integers greater than or equal to 1. Operation 904 includes transmitting, by the second network device to the first network device, a measurement report in response to the receiving the first reference signal.

In some embodiments, the first reference signal includes an identifier of the first network device or of a cell of the first network device. In some embodiments, each of the N occasions is mapped to or is associated with a second reference signal. In some embodiments, the second reference signal includes a channel state information reference signal (CSI-RS) or a synchronization signal block (SSB). In some embodiments, each of the N occasions is mapped to or is associated with: a transmission power for transmission of the first reference signal, and/or a sub-band within which an occasion is located. In some embodiments, the first set of time domain resources associated with an occasion of the N occasions are based on a second set of time domain resources of a second reference signal, and the second reference signal is mapped to the occasion for the first reference signal.

In some embodiments, time domain resources for an occasion for the first reference signal is based on an offset from a second reference signal to which the occasion for the first reference signal is mapped. In some embodiments, the first set of time domain resources for the N occasions are based on a second set of time domain resources of a plurality of second reference signals, a plurality of occasions for the first reference signal are mapped with a same second reference signal, and the plurality of occasions for the first reference signal are in a same time slot. In some embodiments, the plurality of second reference signals or the second reference signal includes a channel state information reference signal (CSI-RS) or a synchronization signal block (SSB). In some embodiments, the first set of frequency domain resources associated with an occasion of the N occasions are based on a second set of frequency domain resources of a second reference signal, and wherein the second reference signal is mapped to the occasion for the first reference signal.

In some embodiments, the first set of frequency domain resources associated with an occasion of the N occasions are based on a frequency domain offset to a second reference signal, and the second reference signal is mapped to the occasion for the first reference signal. In some embodiments, the an index for each occasion of the N occasions is based on: the first set of time domain resources and the first set of frequency domain resources; or an index of a second reference signal, the first set of time domain resources and the first set of frequency domain resources; or a transmission power for the transmitting the first reference signal, the first set of time domain resources and the first set of frequency domain resources; or the index of the second reference signal, the transmission power, the first set of time domain resources and the first set of frequency domain resources. In some embodiments, one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

In some embodiments, indexes of a plurality of second reference signals are mapped to the N occasions associated with the first reference signal in the following order: first, in a first order of a transmission power of the first reference signal on the N occasions, second, in increasing order of one or more frequency resource indexes for the first set of frequency domain resources of the first reference signal on the N occasions, and third, in an increasing order of one or more time resource indexes for the first set of time domain resources of the first reference signal on the N occasion. In some embodiments, the measurement report includes an index corresponding to an occasion associated with the first reference signal, a measured interference strength of the first reference signal in the occasion is smaller than an interference strength measured of a second reference signal mapped to the occasion, and the second reference signal is received by the second network device. In some embodiments, the measurement report includes an index corresponding to an occasion associated with the first reference signal, a measured interference strength of the first reference signal in the occasion is smaller than a threshold. In some embodiments, the first network device includes an aggressor base station that causes an interference experienced by the second network device that includes a victim base station.

In this document the term "exemplary" is used to mean "an example of" and, unless otherwise stated, does not imply an ideal or a preferred embodiment.

Some of the embodiments described herein are described in the general context of methods or processes, which may be implemented in some embodiments by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

transmitting, by a first network device, a first reference signal to a second network device, wherein the first reference signal includes an identifier of the first network device or of a cell of the first network device, wherein the first reference signal is transmitted on N occasions, wherein each of the N occasions is based on a first set of time domain resources and a first set of frequency domain resources of the first reference signal, wherein each of the N occasions includes X time units in time domain and Y frequency units in frequency domain, and wherein N, X, and Y are integers greater than or equal to 1; and receiving, by the first network device from the second network device, a measurement report in response to the transmitting the first reference signal, wherein the measurement report includes an index corresponding to an occasion associated with a transmission of the first reference signal, wherein a measured interference strength of the first reference signal in the occasion is smaller than an interference strength measured of a second reference signal mapped to the occasion, and wherein the second reference signal is transmitted by the first network device.

2. The method of claim 1, wherein each of the N occasions is mapped to or is associated with:

a transmission power for the transmitting the first reference signal, and/or a sub-band within which an occasion is located.

3. The method of claim 1, wherein the first set of time domain resources for the N occasions are based on a second set of time domain resources of a plurality of second reference signals that are transmitted by the first network device, wherein a plurality of occasions for the first reference signal are mapped with a same second reference signal, and wherein the plurality of occasions for the first reference signal are in a same time slot.

4. The method of claim 1, wherein the first set of frequency domain resources associated with an occasion of the N occasions are based on a frequency domain offset to a second reference signal that is transmitted by the first network device, and wherein the second reference signal is mapped to the occasion for the first reference signal.

5. The method of claim 1, wherein one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

6. The method of claim 1, wherein indexes of a plurality of second reference signals transmitted by the first network device are mapped to the N occasions associated with the first reference signal in the following order:

first, in a first order of a transmission power of the first reference signal on the N occasions, second, in increasing order of one or more frequency resource indexes for the first set of frequency domain resources of the first reference signal on the N occasions, and third, in an increasing order of one or more time resource indexes for the first set of time domain resources of the first reference signal on the N occasion.

7. The method of claim 1,
wherein the measurement report includes an index corresponding to an occasion associated with a transmission of the first reference signal,
wherein a measured interference strength of the first reference signal in the occasion is smaller than a threshold,
wherein the threshold is configured by or determined by the first network device, the second network device, or an operation, administration and management (OAM) device.

8. A wireless communication method, comprising:
receiving, by a second network device, a first reference signal from a first network device,
wherein the first reference signal includes an identifier of the first network device or of a cell of the first network device,
wherein the first reference signal is transmitted on N occasions,
wherein each of the N occasions is based on a first set of time domain resources and a first set of frequency domain resources of the first reference signal,
wherein each of the N occasions includes X time units in time domain and Y frequency units in frequency domain, and
wherein N, X, and Y are integers greater than or equal to 1; and
transmitting, by the second network device to the first network device, a measurement report in response to the receiving the first reference signal,
wherein the measurement report includes an index corresponding to an occasion associated with the first reference signal,
wherein a measured interference strength of the first reference signal in the occasion is smaller than an interference strength measured of a second reference signal mapped to the occasion, and
wherein the second reference signal is received by the second network device.

9. The method of claim 8, wherein each of the N occasions is mapped to or is associated with:
a transmission power for transmission of the first reference signal, and/or
a sub-band within which an occasion is located.

10. The method of claim 8,
wherein the first set of time domain resources for the N occasions are based on a second set of time domain resources of a plurality of second reference signals,
wherein a plurality of occasions for the first reference signal are mapped with a same second reference signal, and
wherein the plurality of occasions for the first reference signal are in a same time slot.

11. The method of claim 8,
wherein the first set of frequency domain resources associated with an occasion of the N occasions are based on a frequency domain offset to a second reference signal, and
wherein the second reference signal is mapped to the occasion for the first reference signal.

12. The method of claim 8, wherein one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

13. The method of claim 8, wherein indexes of a plurality of second reference signals are mapped to the N occasions associated with the first reference signal in the following order:
first, in a first order of a transmission power of the first reference signal on the N occasions,
second, in increasing order of one or more frequency resource indexes for the first set of frequency domain resources of the first reference signal on the N occasions, and
third, in an increasing order of one or more time resource indexes for the first set of time domain resources of the first reference signal on the N occasion.

14. The method of claim 8,
wherein the measurement report includes an index corresponding to an occasion associated with the first reference signal,
wherein a measured interference strength of the first reference signal in the occasion is smaller than a threshold.

15. An apparatus for wireless communication comprising at least one processor, configured to implement a method, the at least one processor configured to cause the apparatus to:
transmit, by a first network device, a first reference signal to a second network device,
wherein the first reference signal includes an identifier of the first network device or of a cell of the first network device,
wherein the first reference signal is transmitted on N occasions,
wherein each of the N occasions is based on a first set of time domain resources and a first set of frequency domain resources of the first reference signal,
wherein each of the N occasions includes X time units in time domain and Y frequency units in frequency domain,
wherein N, X, and Y are integers greater than or equal to 1; and
receive, by the first network device from the second network device, a measurement report in response to the transmitting the first reference signal,
wherein:
the first set of frequency domain resources associated with an occasion of the N occasions are based on a frequency domain offset to a second reference signal that is transmitted by the first network device and the second reference signal is mapped to the occasion for the first reference signal, or
wherein the measurement report includes an index corresponding to an occasion associated with a transmission of the first reference signal, wherein a measured interference strength of the first reference signal in the occasion is smaller than an interference strength measured of a second reference signal mapped to the occasion, and wherein the second reference signal is transmitted by the first network device.

16. The apparatus of claim 15, wherein each of the N occasions is mapped to or is associated with:
a transmission power for the transmit the first reference signal, and/or
a sub-band within which an occasion is located.

17. An apparatus for wireless communication comprising at least one processor, configured to implement a method, the at least one processor configured to cause the apparatus to:

receive, by a second network device, a first reference signal from a first network device, wherein the first reference signal includes an identifier of the first network device or of a cell of the first network device, wherein the first reference signal is transmitted on N occasions, wherein each of the N occasions is based on a first set of time domain resources and a first set of frequency domain resources of the first reference signal, wherein each of the N occasions includes X time units in time domain and Y frequency units in frequency domain, wherein N, X, and Y are integers greater than or equal to 1; and transmit, by the second network device to the first network device, a measurement report in response to the receiving the first reference signal, wherein:

the first set of frequency domain resources associated with an occasion of the N occasions are based on a frequency domain offset to a second reference signal that is transmitted by the first network device and the second reference signal is mapped to the occasion for the first reference signal, or wherein the measurement report includes an index corresponding to an occasion associated with a transmission of the first reference signal, wherein a measured interference strength of the first reference signal in the occasion is smaller than an interference strength measured of a second reference signal mapped to the occasion, and wherein the second reference signal is transmitted by the first network device.

18. The apparatus of claim 17, wherein each of the N occasions is mapped to or is associated with:

a transmission power for transmission of the first reference signal, and/or a sub-band within which an occasion is located.

19. The apparatus of claim 15, wherein one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

20. The apparatus of claim 17, wherein one or more indexes of the N occasions are mapped in a first increasing order of one or more frequency resource indexes for the first set of frequency domain resources of the first reference signal and then in a second increasing order of one or more time resource indexes for the first set of time domain resources of the first reference signal.

* * * * *